(12) United States Patent
Petry et al.

(10) Patent No.: US 12,510,262 B2
(45) Date of Patent: Dec. 30, 2025

(54) WEIGHTED RETURN TEMPERATURE LIMITATION

(71) Applicant: Siemens Schweiz AG, Zürich (CH)

(72) Inventors: Karl-Heinz Petry, Reichenburg (CH); Kuno Marbach, Emmenbrücke (CH)

(73) Assignee: SIEMENS SCHWEIZ AG, Zürich (CH)

( * ) Notice: Subject to any disclaimer, the term of this patent is extended or adjusted under 35 U.S.C. 154(b) by 166 days.

(21) Appl. No.: 18/426,705

(22) Filed: Jan. 30, 2024

(65) Prior Publication Data

US 2024/0255170 A1 Aug. 1, 2024

(30) Foreign Application Priority Data

Feb. 1, 2023 (EP) ..................... 23154394

(51) Int. Cl.
*F24F 11/84* (2018.01)
*F24F 140/20* (2018.01)

(52) U.S. Cl.
CPC ........... *F24F 11/84* (2018.01); *F24F 2140/20* (2018.01)

(58) Field of Classification Search
CPC ........ F24F 11/84; F24F 11/83; F24F 2140/20; F24F 11/64
See application file for complete search history.

(56) References Cited

U.S. PATENT DOCUMENTS

| 4,651,535 A * | 3/1987 | Alsenz | F25B 49/02 |
| | | | 62/223 |
| 6,352,106 B1 | 3/2002 | Hartman | 165/293 |
| 8,205,465 B2 * | 6/2012 | Huerta-Ochoa | F25B 41/35 |
| | | | 62/224 |
| 9,618,247 B2 * | 4/2017 | Jekimow | F25B 41/385 |
| 10,696,134 B2 * | 6/2020 | Cosgrove | B60H 1/08 |
| 10,712,042 B2 * | 7/2020 | Passoni | G05D 23/1919 |
| 11,644,215 B2 * | 5/2023 | Glanzer | F24F 11/84 |
| | | | 165/293 |
| 2016/0139608 A1 | 5/2016 | Eickhoff | G05D 7/06 |
| 2017/0176032 A1 | 6/2017 | Bearinger | G01N 1/38 |

FOREIGN PATENT DOCUMENTS

| EP | 2 997 430 | 8/2019 | ............. G05D 23/19 |
| EP | 3 218 212 | 2/2021 | ............. B60H 1/00 |
| EP | 3 344 925 | 5/2021 | ............. F24F 11/00 |
| WO | 2019 040884 | 2/2019 | ............. F24F 11/84 |
| WO | 2020 114668 | 6/2020 | ............. F24F 11/62 |

* cited by examiner

*Primary Examiner* — Lionel Nouketcha
(74) *Attorney, Agent, or Firm* — Slayden Grubert Beard PLLC

(57) ABSTRACT

Various embodiments of the present disclosure optimize energy usage of an HVAC system. For example, some embodiments include a method comprising: generating a flow through a heat exchanger; determining a return temperature of fluid having passed through heat exchanger; determining a current flow of the fluid through the heat exchanger; and controlling the flow of the fluid based on a comparison of the determined return temperature with a threshold temperature, wherein the threshold temperature is dependent on the current flow.

14 Claims, 1 Drawing Sheet

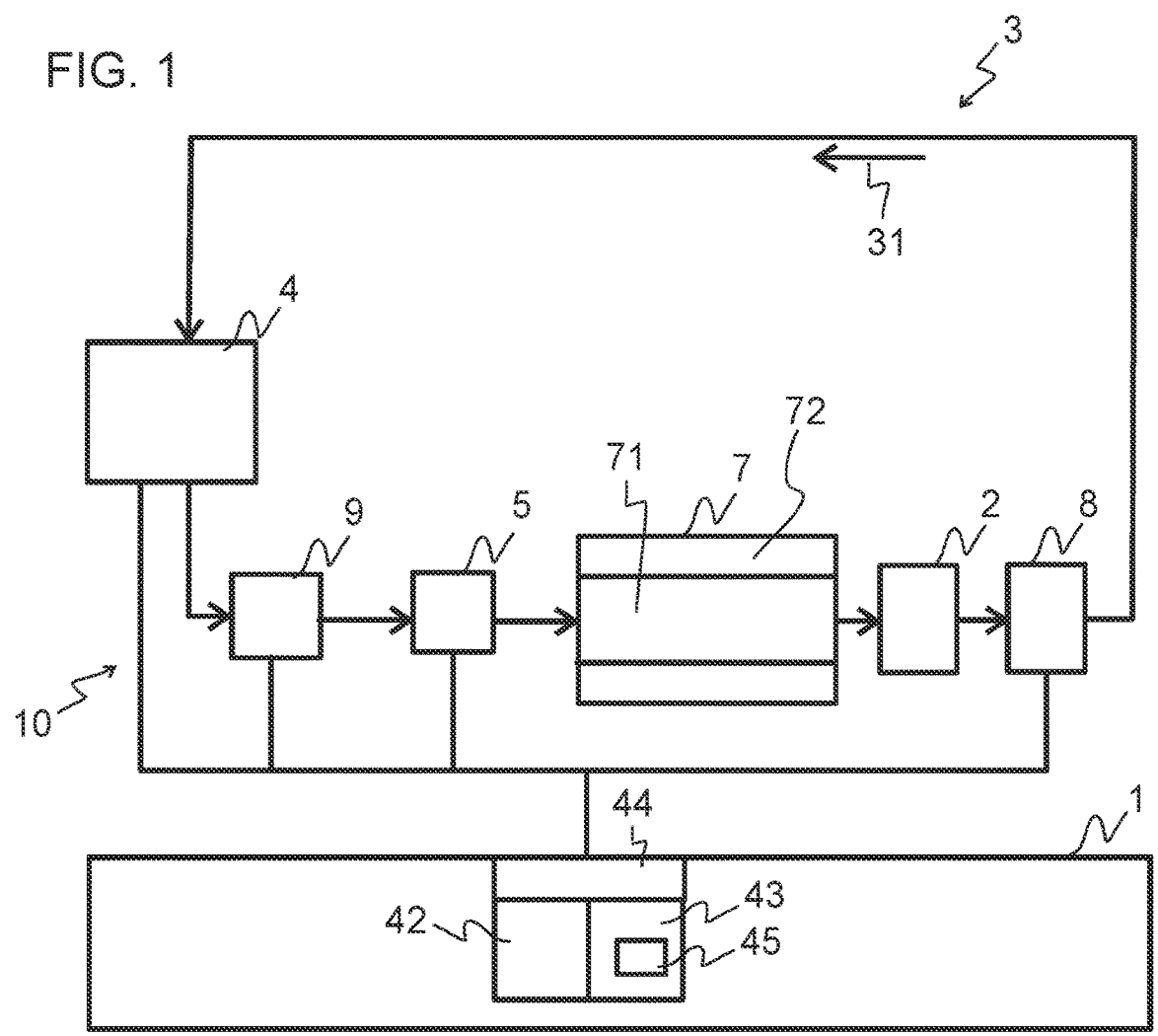
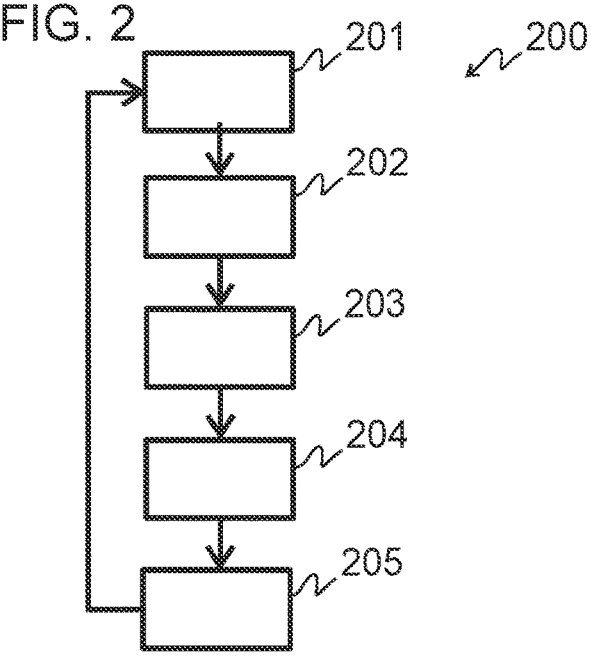

WEIGHTED RETURN TEMPERATURE LIMITATION

CROSS-REFERENCE TO RELATED APPLICATIONS

This application claims priority to EP Application No. 23154394.3 filed Feb. 1, 2023, the contents of which are hereby incorporated by reference in their entirety.

TECHNICAL FIELD

The instant disclosure generally relates to the technical field of controlling HVAC systems. Various embodiments of the teachings herein include systems and/or methods for HVAC control.

BACKGROUND

HVAC stands for heating, ventilation, and air conditioning. A HVAC system does not need to be suited to accomplish all these functions. A simple heating system that is only suited to heat up a room, building, facility, or the like, but not suited to cool it down is also to be considered a HVAC system. The same accounts for an air conditioning system that is suited to cool down a room temperature, but not to heat a room. Of course, also a system that is capable of both, heating and cooling, is to be considered an HVAC system.

Heating and cooling coils of HVAC systems are subject to excessive heat and water flow which results in unwanted energy usage at the generation (boiler, chiller) and at the distribution (pump) as well as in unwanted low delta T on the primary side of the coil. In the technical field, the expression "delta T" is used to address the temperature difference between water or another fluid exiting the coil and water or another fluid entering the coil. Impact factors of this unwanted energy usage are e.g., supply temperature of the water side, inlet temperature and humidity of the air side and setpoint temperature of the supply air.

An operation point of a coil can thereby be described as a value for a flow of the fluid through a coil and a heat flow dissipated by the coil from the primary side of the coil to the secondary side. E.g., the primary side is represented by water circulating in a simple heating system, while the secondary side represented by the air that is heated up by the heating system. In a simple air conditioning system, the primary side is represented by the cooling fluid, while the secondary side is represented by the air side. In more complex systems, heat or cold is passed on over several fluid circuits from one fluid circuit to another before being finally used to heat or cool room air. In such systems, for a coil the primary side is the side that provides heat or cold, while the secondary side is the side that receives heat or cold from the primary side. For the sake of this disclosure, it is not relevant how many fluid circuits are involved.

There are several methods available to limit heat flow, water flow and delta T respectively for the sake of energy savings. The limitation variants differ from each other by the wanted/unwanted cut away of operation points. For controlling the transmission of heat or cold from a primary side to a secondary side of a coil, it is for example known to limit the absolute or relative mass flow of the fluid. This solution cuts away operation points exceeding a threshold value for the flow.

It is further known to limit the power, i.e. to limit energy transmitted per time unit from the primary side to the secondary side. In case the energy transmitted falls short a given threshold value, the flow is reduced. It is also known to limit the return temperature of the fluid on the primary side. In case the return temperature exceeds or falls short a given threshold value, the flow is reduced.

It is further known to limit delta T, which means that the flow of the fluid is controlled in such a way that the temperature difference between the temperature of a fluid entering a coil and a return temperature must exceed a certain given threshold. It is further known to limit delta T in a scaled manner, which means that the flow of the fluid is controlled which considers delta T and flow directly and indirectly the heat flow.

EP 2 997 430 B1 discloses controlling the opening of a valve of an HVAC system depending on the temperature difference between the supply temperature and the return temperature. The opening of the valve is controlled depending on the flow and the temperature difference.

EP 3 218 212 B1 discloses controlling the flow of air into the zones of a variable air volume HVAC system having actuator driven dampers, which operate in a range from a minimum damper position to a maximum damper position for adjusting the flow of air into a zone, flow measurement values and current damper positions are transmitted via a telecommunications network to a cloud-based HVAC control center.

EP 3 344 925 B1 discloses that for operating a thermal energy exchanger for exchanging thermal energy between a thermal transfer fluid and air, a plurality of measurement data sets are recorded in a control system. The measurement data sets include for a different point in time data values which define a normalized energy transfer that represents the thermal energy transferred in the thermal energy exchanger normalized by one or more normalization variables.

WO 2019/040884 A1 discloses a heating, ventilation, and air conditioning (HVAC) system that includes a heat exchanger configured to circulate a working fluid therethrough, a valve configured to regulate a flow rate of the working fluid through the heat exchanger, and a valve controller configured to modify a valve position control signal received from an external controller, separate from the valve controller, based on a temperature differential of the working fluid entering and exiting the heat exchanger.

SUMMARY

Teachings of the present disclosure may be used to optimize energy usage of an HVAC system. For example, some embodiments include a method for operating a HVAC system (3), comprising: (a) generating (201) a flow (31) of a fluid through a thermal energy exchange system (7) of the HVAC system (3) resulting in an exchange of thermal energy between a primary side of the thermal energy exchange system (7) and a secondary side of the thermal energy exchange system (7); (b) determining (202) a return temperature of fluid having passed through thermal energy exchange system (7); (c) determining (203) a current flow of the fluid through the thermal energy exchange system (7); and (d) controlling (205) the flow of the fluid based on a comparison of the determined return temperature with a threshold temperature (TrtLim), wherein the threshold temperature is dependent on the current flow.

In some embodiments, controlling the flow of the fluid is independent of any measurement of a supply temperature of a fluid supplied to the thermal energy exchange system (7).

In some embodiments, the flow of the fluid is additionally controlled by preventing the flow to exceed a maximum value.

In some embodiments, for a heating application the threshold temperature (TrtLim) is dependent on the current flow ($\dot{V}$) as follows: the threshold temperature (TrtLim) is a reference return temperature (TrtRef) when the current flow ($\dot{V}$) of the fluid is a design flow ($\dot{V}_{Dsgn}$); the threshold temperature (TrtLim) approaches a maximum threshold temperature (TrtMax) when the current flow ($\dot{V}$) approaches a minimum flow, wherein the maximum threshold temperature is a sum of the reference return temperature (TrtRef) and a positive flow-dependent summand; and the threshold temperature (TrtLim) is the lower, the higher the current flow ($\dot{V}$) of the fluid is.

In some embodiments, for a cooling application the threshold temperature (TrtLim) is dependent on the current flow ($\dot{V}$) as follows: the threshold temperature (TrtLim) is a reference return temperature (TrtRef) when the current flow ($\dot{V}$) of the fluid is a design flow ($\dot{V}_{Dsgn}$); the threshold temperature (TrtLim) approaches a minimum threshold temperature (TrtMin), wherein the minimum threshold temperature preferably is a difference of the reference return temperature (TrtRef) minus a positive flow-dependent summand when the current flow ($\dot{V}$) approaches a flow of zero; and the threshold temperature (TrtLim) is the higher, the higher the current flow ($\dot{V}$) of the fluid is.

In some embodiments, the flow of the fluid through the thermal energy exchange system is reduced in case the return temperature exceeds the threshold temperature and/or increased in case the return temperature falls below the threshold temperature.

In some embodiments, the flow of the fluid through the thermal energy exchange system is reduced in case the return temperature falls below the threshold temperature and/or increased in case the return temperature exceeds the threshold temperature.

As another example, some embodiments include a control system (1) for controlling a flow device (5, 4) for controlling a flow (31) of a fluid through a thermal energy exchange system (7), the control system (1) comprising at least one interface (44) and a processing system (47); the at least one interface (44) configured for receiving a temperature signal comprising a return temperature of fluid having passed through the thermal energy exchange system (7), and for receiving a signal comprising a current flow of fluid through the thermal energy exchange system (7); and the processing system (47) configured for determining a threshold temperature that is dependent on the current flow, and for controlling the flow device (5, 4) to control the flow (31) of a fluid through the thermal energy exchange system (7) based on a comparison of the determined return temperature with the threshold temperature.

In some embodiments, the processing system (47) is configured to control the flow device (5, 4) independent of any measurement of a supply temperature of a fluid supplied to the thermal energy exchange system (7).

In some embodiments, the control system (1) is additionally configured to control the flow (31) of the fluid by preventing the flow to exceed a maximum value.

In some embodiments, the processing system (47) is configured to determine the threshold temperature (TrtLim) according to the following conditions: the threshold temperature (TrtLim) is a reference return temperature (TrtRef) when the current flow ($\dot{V}$) of the fluid is a design flow ($\dot{V}_{Dsgn}$); the threshold temperature (TrtLim) approaches a maximum threshold temperature (TrtMax) when the current flow ($\dot{V}$) approaches a minimum flow, wherein the maximum threshold temperature preferably is a sum of the reference return temperature (TrtRef) and a positive flow-dependent summand; and the threshold temperature (TrtLim) is the lower, the lower the current flow ($\dot{V}$) of the fluid is.

In some embodiments, the processing system (47) is configured to determine the threshold temperature (TrtLim) according to the following conditions: the threshold temperature (TrtLim) is a reference return temperature (TrtRef) when the current flow ($\dot{V}$) of the fluid is a design flow ($\dot{V}_{Dsgn}$); the threshold temperature (TrtLim) approaches a minimum threshold temperature (TrtMin), wherein the minimum threshold temperature preferably is a difference of the reference return temperature (TrtRef) minus a positive flow-dependent summand when the current flow ($\dot{V}$) approaches a flow of zero; and the threshold temperature (TrtLim) is the higher, the lower the current flow ($\dot{V}$) of the fluid is.

In some embodiments, the processing system (47) is configured to cause the flow device (5, 4) to reduce the flow (31) of the fluid through the thermal energy exchange system (7) in case the return temperature exceeds the threshold temperature and/or to increase the flow (31) of the fluid through the thermal energy exchange system (7) in case the return temperature falls below the threshold temperature.

In some embodiments, the processing system (47) is configured to cause the flow device (5, 4) to increase the flow (31) of the fluid through the thermal energy exchange system (7) in case the return temperature exceeds the threshold temperature and/or to reduce the flow (31) of the fluid through the thermal energy exchange system (7) in case the return temperature falls below the threshold temperature.

As another example, some embodiments include a computer program comprising instructions to cause a control system (1) to execute one or more of the methods described herein.

BRIEF DESCRIPTION OF THE DRAWINGS

Various features are apparent to those skilled in the art from the following detailed description of the disclosed non-limiting embodiments. The drawings that accompany the de-tailed description can be briefly described as follows:

FIG. 1 schematically depicts a block diagram of an example HVAC system incorporating teachings of the present disclosure; and FIG. 2 schematically depicts a flow chart of an exemplary method 200 for operating a HVAC system incorporating teachings of the present disclosure.

DETAILED DESCRIPTION

In some embodiments, a flow of a fluid through a thermal energy exchange system is generated. The thermal energy exchange system can for example be a coil or a heat exchanger. The flow of the fluid through the thermal energy exchange system results in an exchange of thermal energy between a primary side of the thermal energy exchange system and a secondary side of the thermal energy exchange system.

A return temperature of fluid having passed through the thermal energy exchange system is determined. A current flow of the fluid through the thermal energy exchange system is determined. The flow of the fluid is controlled based on a comparison of the determined return temperature with a threshold temperature. The threshold temperature is dependent on the current flow.

In some embodiments, a control system for automatically controlling a flow device for controlling the flow of a fluid through a thermal energy exchange system comprises at least one interface and a processing system. The at least one interface is configured for receiving a temperature signal comprising a return temperature of fluid having passed through the thermal energy exchange system. The at least one interface is furthermore configured for receiving a signal comprising a current flow of fluid through the thermal energy exchange system. The processing system is configured for determining a threshold temperature that is dependent on the current flow. The processing system is further configured for controlling the flow device for controlling the flow of a fluid through a thermal energy exchange system based on a comparison of the determined return temperature with the threshold temperature.

In some embodiments, a computer program comprises instructions to cause said control system to execute one or more of the methods described herein.

In some embodiments, controlling of the flow of the fluid is independent of any measurement of an inlet temperature of the fluid supplied to the inlet of the thermal energy exchange system. A separate device for measuring the inlet temperature of the fluid to the thermal energy exchange system can therefore be avoided, while the limitation method nevertheless is independent of fluctuations of the supply temperature and provides a more stable return temperature of the fluid that can then be returned to a boiler for a heating application or a chiller for a cooling application. A delta T limitation would be directly affected by these fluctuations. This limitation method enables more comfort points by providing additional allowed operation points.

In some embodiments, the control system is additionally configured to control the flow of the fluid by preventing the flow to exceed a maximum value. This allows to strictly prevent the flow from exceeding the design flow. The flow is thus reduced e.g. by closing the valve or turning down the pump in case the determined current flow exceeds the maximum value. This allows to additionally combine a closed loop control involving a pure flow limitation with a weighted return temperature limitation that is based on the threshold temperature, i.e., the return threshold temperature being dependent on the current flow.

In some embodiments, the threshold temperature is dependent on the current flow as follows:
the threshold temperature is a reference return temperature when the current flow of the fluid is a design flow;
the threshold temperature approaches a maximum threshold temperature when the current flow approaches a minimum flow, wherein the maximum threshold temperature preferably is a sum of the reference return temperature and a positive flow-dependent summand; and/or
the threshold temperature is the lower, the higher the current flow of the fluid is. In other words, the threshold temperature is a monotonous function of the current flow defined between the minimum flow and the design flow. The minimum flow can be for example a flow of 0 or another flow value smaller than the design flow.

In some embodiments, the threshold temperature is dependent on the current flow as follows:
the threshold temperature is a reference return temperature when the current flow of the fluid is a design flow;
the threshold temperature approaches a minimum threshold temperature, wherein the minimum threshold temperature preferably is a difference of the reference return temperature minus a positive flow-dependent summand when the current flow approaches a minimum flow; and/or
the threshold temperature is the higher, the higher the current flow of the fluid is. In other words, the threshold temperature is a monotonous function of the current flow defined between the minimum flow and the design flow. The minimum flow can for example be a flow of 0 or another flow value smaller than the design flow.

In some embodiments, determining the threshold temperature (TrtLim) uses the formula:

$$TrtLim = TrtRef \pm k * \left(1 - \frac{\dot{V}}{\dot{V}_{Dsgn}}\right),$$

wherein TrtRef is a constant reference return temperature limit, while $$\frac{\dot{V}}{\dot{V}_{Dsgn}}$$

is the relative flow (i.e. the ratio between the current flow and the design flow) which varies depending on the current flow of the fluid, while k is a weighting factor k≥0.

Regarding the sign "±", the positive sign "+" applies for heating applications, while the negative sign "−" applies for cooling applications.

In some embodiments, the weighting factor k is within a range between 8 and 10 Kelvin.

In some embodiments, the flow of the fluid through the thermal energy exchange system is reduced in case the return temperature exceeds the threshold temperature. In some embodiments, the flow of the fluid through the thermal energy exchange system is increased in case the return temperature falls below the threshold temperature. This allows to optimize energy usage for heating applications.

In some embodiments, the flow of the fluid through the thermal energy exchange system is reduced in case the return temperature falls below the threshold temperature. In some embodiments, the flow of the fluid through the thermal energy exchange system is increased in case the return temperature exceeds the threshold temperature. This allows to optimize energy usage for cooling applications.

In some embodiments, the flow of the fluid through the thermal energy exchange system is part of a circular flow of the HVAC system, wherein fluid having passed through the thermal energy exchange system is passed through a second energy exchange system changing the temperature of the fluid in the opposite direction of the (first) energy exchange system and thereafter resupplied to the thermal energy exchange system.

In some embodiments, the flow of the fluid through the thermal energy exchange system does not need to be part of a circular flow. For example, a constant source of a warm fluid can provide for the flow of the fluid through the thermal energy exchange system for heating applications. In some embodiments, a constant source of a warm fluid can provide for the flow of the fluid through the thermal energy exchange system for cooling applications.

FIG. 1 shows a block diagram of a HVAC system 3. The HVAC system 3 comprises a boiler 9, a pump 4, a valve 5, a coil 7, a temperature sensor 2, a flow meter 8, and a control system 1.

The pump 4, the boiler 9, the valve 5, the coil 7, the temperature sensor 2, and the flow meter 8 make up a circular system 10. The pump 4 is configured to pump a flow 31 of a fluid along the circular system 10 from an outlet of the pump 4 to the boiler 9 to the valve 5 to the coil 7 to the temperature sensor 2, to the flow meter 8, and from the flow meter 8 to an inlet of the pump 4. The sequence of these elements 4, 9, 5, 7, 2, 8, 4 describes only one example. Many other sequences and variations of these elements or omission of some of the elements 2, 4, 6, 7, 8, 9 can be implemented in other embodiments.

The boiler 9 is configured to heat up the fluid that is circulating in the circular system 10.

The valve 5 is configured to be controllably opened and closed for controlling the flow 31 through the circular system 10.

The coil 7 is a thermal energy exchange system and comprises a primary side 71, through which the fluid is pumped. In the following, the fluid is also called the first fluid. The coil 7 further comprises a secondary 72 side through which a second fluid is pumped, or along which a second fluid flows due to convection. When fluid heated by the boiler 9 is pumped through the primary side 71 of the coil 7, heat is transferred through the coil 7 to the secondary side 72, heating up the second fluid on the secondary side 72 of the coil. The first fluid is thus cooled down.

The temperature sensor 2 measures the return temperature of fluid exiting the coil 7. In the embodiment of FIG. 1, the temperature sensor 2 is arranged at the outlet of the coil 7. In variants of this embodiment, the temperature sensor 2 can be arranged anywhere along the circular system 10 between the outlet of the coil 7 and the inlet of the boiler 9 for measuring the return temperature.

The flow meter 8 measures the flow of the primary fluid through the coil 7. In the exemplary HVAC system 3 shown in FIG. 3, the flow meter 8 can be arranged at any location along the circular system 10 for measuring the flow through the coil 7. In HVAC systems where the pump 4 and/or boiler 9 are used in a shared manner to supply fluid to several coils, the flow meter can be arranged at any location in the circular system 10 that is suited for measuring the flow through the coil.

The control system 1 comprises a processing system 47 and one or more interfaces 44. The processing system 47 comprises a processor 42 and an accessible memory 43.

The one or more interfaces 44 are communicatively connected to the temperature sensor 2, to the valve 5, and to the flow meter 8. The communication connections can be digital or analogue, wired or wireless. The control system 1 is adapted to receive digital or analog data from the temperature sensor 2 and from the flow meter 8. That is, the control system is adapted to decode signals from the temperature sensor 2 and the flow meter 8, and to determine the current return temperature and the current flow. The control system 1 is further adapted to control the valve 5 by sending signals to the valve 5, causing the valve to open or close. Thus, the control system is adapted to control the flow 31 of the fluid in the circular system 10.

The accessible memory 43 comprises a computer program 45 comprising instructions to cause the control system 1 to process the data received from the temperature sensor 2 and the flow meter 8 by determining a threshold temperature which is a function dependent on the measured current flow. The control system is configured to control the flow 31 of the fluid by controlling the valve 5 based on a comparison of the determined return temperature with a threshold temperature, wherein the threshold temperature is dependent on the current flow, but independent of any measurement of a supply temperature of fluid supplied to the coil.

FIG. 2 shows a flow chart of an exemplary method 200 for automatically operating a HVAC system 3 incorporating teachings of the present disclosure. In a method step 201, the flow 31 of the fluid through the coil 7 is generated. This results in an exchange of thermal energy between the primary side of the thermal energy exchange system 7 and the secondary side of the thermal energy exchange system 7. In method step 202 the return temperature of fluid having passed through thermal energy exchange system 7 is determined.

In method step 203 the current flow of the fluid through the thermal energy exchange system 7 is determined. In method step 204 a threshold temperature that depends on the current flow is determined. In method step 205 the flow 31 of the fluid is controlled by controlling the valve 5 based on a comparison of the determined return temperature with the determined threshold temperature. The method 200 may be repeated in an iterative way to permanently control operation of the HVAC system until an abortion condition is fulfilled, e.g. the HVAC system is turned off.

In some embodiments, the return temperature is limited based on a weighting with the relative flow of the fluid. The reference return temperature limit is:

$$TrtRef = TrtDsgn \pm TrtOffs$$

Where TrtDsgn is the design return temperature and TrtOffs is a safety offset≥0 Kelvin, e.g. 0.5 Kelvin. The positive sign is used for heating applications and the negative sign for cooling applications.

The sign may easily be calculated from the design temperatures on the primary side which in a preferred example is a water side:

$$TrtRef = TrtDsgn + \text{sign}\ (TsplDesgn - TrtDsgn) * TrtOffs$$

Where TsplDesgn is the design supply temperature.
The final weighted return temperature limit is defined by $$TrtLim = TrtRef \pm k * \left(1 - \frac{\dot{V}}{\dot{V}_{Dsgn}}\right)$$

The sign may also be calculated as before. The weighting factor k≥0 may be between 8 Kelvin and 10 Kelvin.

The current return temperature is compared with the weighted return temperature limit. If the current value is higher/lower than the limit in heating/cooling mode, the flow will be reduced by closing the valve until the limitation condition is satisfied. In some embodiments, the pure flow limitation may be combined with the weighted return temperature limitation to strictly prevent the flow to exceed the design flow.

In some embodiments, e.g. for a heating application, the threshold temperature TrtLim is dependent on the current flow $\dot{V}$ as follows:
  the threshold temperature TrtLim is a reference return temperature TrtDsgn when the current flow $\dot{V}$ of the fluid is a design flow $\dot{V}_{Dsgn}$;
  the threshold temperature TrtLim approaches a maximum threshold temperature TrtMax being the sum of the reference return temperature TrtDsgn plus an offset TrtOffs when the current flow $\dot{V}$ approaches a flow of zero;

the threshold temperature TrtLim is the lower, the higher the current flow $\dot{V}$ of the fluid is.

In some embodiments, e.g. for a cooling application, the threshold temperature TrtLim is dependent on the current flow $\dot{V}$ as follows:

the threshold temperature TrtLim is a reference return temperature TrtDsgn when the current flow $\dot{V}$ of the fluid is a design flow $\dot{V}_{Dsgn}$;

the threshold temperature TrtLim approaches a minimum threshold temperature TrtMin being the difference of the reference return temperature TrtDsgn minus an offset TrtOffs when the current flow $\dot{V}$ approaches a flow of zero;

the threshold temperature TrtLim is the higher, the higher the current flow $\dot{V}$ of the fluid is.

In some embodiments, the control of the flow 31 based on the threshold dependent on the current flow is implemented as a closed loop control. Other closed loop controls can be superimposed on this closed loop control. For example, the flow 31 of the fluid can be additionally controlled by preventing the flow to exceed a maximum value, e.g. a design flow for which the thermal energy exchange system 7, some other component of the circular system 10 or the circular system 10 as a whole was designed for. Thereby the flow is reduced by closing the valve 5 in case the determined current flow exceeds or approaches the threshold value. Thus, the pure flow limitation may be combined with the weighted return temperature limitation to strictly prevent the flow to exceed the design flow. In some embodiments, a fixed delta T limitation is superimposed.

The embodiments shown in FIGS. 1 and 2 show a heating application with a boiler 9. In case the return temperature exceeds the threshold temperature, the flow of the fluid through the thermal energy exchange system is reduced. In case the return temperature falls below the threshold temperature, the flow of the fluid through the thermal energy exchange system is increased.

Instead of relating to heating applications with a boiler 9, other embodiments relate to cooling applications, such as air conditioning. In cooling embodiments, the concept in FIG. 1 is altered by using a chiller instead of a boiler. In these embodiments, in case the return temperature falls below the threshold temperature, the flow of the fluid through the thermal energy exchange system is reduced. In case the return temperature exceeds the threshold temperature, the flow of the fluid through the thermal energy exchange system is increased.

Instead of controlling the flow 31 by opening and closing of the valve 5, in further embodiments the flow 31 can additionally or alternatively also be controlled by increasing or decreasing the activity of the pump 4.

The embodiments previously discussed in connection with the figures are circular systems, in which the fluid having passed through the coil 72, is passed through a second energy exchange system 9, changing the temperature of the fluid in the opposite direction of the coil 7 and thereafter resupplied to the thermal energy exchange system. In case of heating applications, the second energy exchange system 9 can be a boiler for heating up the fluid. In case of cooling applications, the second energy exchange system 9 can be a chiller for cooling down the fluid.

It should be understood that the foregoing relates only to certain embodiments of the teachings herein and that numerous changes may be made therein without departing the scope of the disclosure as defined by the following claims. It should also be understood that the disclosure is not restricted to the illustrated embodiments and that various modifications can be made within the scope of the following claims.

The invention claimed is:

1. A method for operating a HVAC system, the method comprising:
    (a) generating a flow of a fluid through a thermal energy exchange system of the HVAC system resulting in an exchange of thermal energy between a primary side of the thermal energy exchange system and a secondary side of the thermal energy exchange system;
    (b) determining a return temperature of fluid having passed through thermal energy exchange system;
    (c) determining a current flow of the fluid through the thermal energy exchange system; and
    (d) controlling the flow of the fluid based on a comparison of the determined return temperature with a threshold temperature, wherein the threshold temperature is dependent on the current flow.

2. The method according to claim 1, wherein controlling the flow of the fluid is independent of any measurement of a supply temperature of a fluid supplied to the thermal energy exchange system.

3. The method according to claim 1, further comprising controlling the flow of the fluid by preventing the flow to exceed a maximum value.

4. The method according to claim 1, wherein for a heating application the threshold temperature is dependent on the current flow as follows:
    the threshold temperature is a reference return temperature when the current flow of the fluid is a design flow;
    the threshold temperature approaches a maximum threshold temperature when the current flow approaches a minimum flow, wherein the maximum threshold temperature comprises a sum of the reference return temperature and a positive flow-dependent summand; and
    the threshold temperature is the lower, the higher the current flow of the fluid is.

5. The method according to claim 1, wherein for a cooling application the threshold temperature depends on the current flow as follows:
    the threshold temperature is a reference return temperature when the current flow of the fluid is a design flow;
    the threshold temperature approaches a minimum threshold temperature, wherein the minimum threshold temperature comprises is a difference of the reference return temperature minus a positive flow-dependent summand when the current flow approaches a flow of zero; and
    the threshold temperature is the higher, the higher the current flow of the fluid is.

6. The method according to claim 1, wherein the flow of the fluid through the thermal energy exchange system is reduced any time the return temperature exceeds the threshold temperature and/or increased any time the return temperature falls below the threshold temperature.

7. The method according to claim 1, further comprising reducing the flow of the fluid through the thermal energy exchange system any time the return temperature falls below the threshold temperature and/or increasing the flow any time the return temperature exceeds the threshold temperature.

8. A control system for controlling a flow of a fluid through a thermal energy exchange system, the control system comprising:

an interface to receive a temperature signal comprising a return temperature of fluid having passed through the thermal energy exchange system and a signal comprising a current flow of fluid through the thermal energy exchange system; and a processing system to determine a threshold temperature dependent on the current flow, and control a flow device to adjust the flow of a fluid through the thermal energy exchange system based on a comparison of the determined return temperature with the threshold temperature.

9. The control system according to claim 8, wherein the processing system controls the flow device independent of any measurement of a supply temperature of a fluid supplied to the thermal energy exchange system.

10. The control system according to claim 9, wherein the processing system causes the flow device to reduce the flow of the fluid through the thermal energy exchange system any time the return temperature exceeds the threshold temperature and/or to increase the flow of the fluid through the thermal energy exchange system any time the return temperature falls below the threshold temperature.

11. The control system according to claim 9, wherein the processing system causes the flow device to increase the flow of the fluid through the thermal energy exchange system any time the return temperature exceeds the threshold temperature and/or to reduce the flow of the fluid through the thermal energy exchange system any time the return temperature falls below the threshold temperature.

12. The control system according to claim 8, wherein the control system controls the flow of the fluid by preventing the flow to exceed a maximum value.

13. The control system according to claim 8, wherein the processing system determines the threshold temperature according to:
the threshold temperature is a reference return temperature when the current flow of the fluid is a design flow;
the threshold temperature approaches a maximum threshold temperature when the current flow approaches a minimum flow, wherein the maximum threshold temperature comprises is a sum of the reference return temperature and a positive flow-dependent summand; and
the threshold temperature is the lower, the lower the current flow of the fluid is.

14. The control system according to claim 8, wherein the processing system determines the threshold temperature according to:
the threshold temperature is a reference return temperature when the current flow of the fluid is a design flow;
the threshold temperature approaches minimum threshold temperature, wherein the minimum threshold temperature comprises a difference of the reference return temperature minus a positive flow-dependent summand when the current flow approaches a flow of zero; and
the threshold temperature is the higher, the lower the current flow of the fluid is.

* * * * *